United States Patent
Saxena et al.

(10) Patent No.: US 10,462,148 B2
(45) Date of Patent: Oct. 29, 2019

(54) DYNAMIC DATA MASKING FOR MAINFRAME APPLICATION

(71) Applicant: Tata Consultancy Services Limited, Mumbai (IN)

(72) Inventors: Rohit Saxena, Pune (IN); Amit Prakash Jadhav, Pune (IN); Manish Shukla, Pune (IN); Vijayanand Mahadeo Banahatti, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 187 days.

(21) Appl. No.: 15/067,870

(22) Filed: Mar. 11, 2016

(65) Prior Publication Data

US 2016/0269417 A1 Sep. 15, 2016

(30) Foreign Application Priority Data

Mar. 13, 2015 (IN) .......................... 829/MUM/2015

(51) Int. Cl.
  *H04L 29/06* (2006.01)
  *G06F 21/62* (2013.01)

(52) U.S. Cl.
  CPC ........ *H04L 63/102* (2013.01); *G06F 21/6245* (2013.01); *G06F 21/6254* (2013.01); *H04L 63/06* (2013.01); *H04L 63/08* (2013.01); *H04L 63/20* (2013.01)

(58) Field of Classification Search
  CPC ....... H04L 63/06; H04L 63/08; H04L 63/102; H04L 3/20; G06F 21/6245; G06F 21/6254; G06F 8/34; G06F 7/30699; G06F 21/6218

USPC ............................................................ 726/1
See application file for complete search history.

(56) References Cited

U.S. PATENT DOCUMENTS

| 8,087,021 B1 | 12/2011 | Holdman et al. |
| 2009/0048997 A1* | 2/2009 | Manickam ............. G06F 21/62 706/47 |
| 2010/0077360 A1 | 3/2010 | Nason et al. |
| 2012/0054095 A1* | 3/2012 | Lesandro ............. G06Q 20/10 705/39 |
| 2012/0239540 A1 | 9/2012 | Rogers, Jr. et al. |

(Continued)

*Primary Examiner* — Alexander Lagor
*Assistant Examiner* — William B Jones
(74) *Attorney, Agent, or Firm* — Finnegan, Henderson, Farabow, Garrett & Dunner LLP

(57) ABSTRACT

This disclosure relates generally to data masking, and more particularly to method and system for dynamic data masking for mainframe application. In one embodiment, the method includes receiving a request to access a mainframe application from a user profile. A role assigned to the user-profile is fetched from a roles-repository. The role defines rights associated with the user-profile to access information from the mainframe application. Corresponding to the request, an access session is initiated based on the role, and a screen is received. The screen includes a multiple fields, where one or more fields includes sensitive data associated with the mainframe application. Contextual information associated with the plurality of fields is identified corresponding to the session. Rules indicative of the fields to be masked, are fetched corresponding to the screen based on the role. The fields are masked based on the rule and the contextual information associated with the fields.

17 Claims, 8 Drawing Sheets

(56) References Cited

U.S. PATENT DOCUMENTS

2013/0212689 A1* 8/2013 Ben-Natan .............. H04L 63/20
726/26
2014/0040134 A1* 2/2014 Ciurea ................. G06Q 20/383
705/44

* cited by examiner

```
5,10
|
USER INFORMATION
7,10
|
USERNAME        [AXB1023]
9,10
|
DATE OF BIRTH   [1/2/1980]
11,10
|
PHONE           [+1 098-765-4321]
25,10
|
CONTACT US
26,10
|
PHONE           [+1 345-678-9012]
```
— 402

```
                                                    ┌─ 502
┌─────────────────────────────────┐
│  ┌─────────────────┐            │
│  │ USER INFORMATION│            │
│  └─────────────────┘            │
│  ┌──────────┐  ┌──────────────┐ │
│  │ USERNAME │  │ AXB1023      │ │
│  └──────────┘  └──────────────┘ │
│  ┌──────────────┐ ┌───────────┐ │
│  │ DATE OF BIRTH│ │ 1/2/1980  │ │
│  └──────────────┘ └───────────┘ │
│  ┌────────┐    ┌────────────────┐│
│  │ PHONE  │    │ +1 098-765-4321││
│  └────────┘    └────────────────┘│
│                                 │
│  ┌────────────┐                 │
│  │ CONTACT US │                 │
│  └────────────┘                 │
│  ┌────────┐    ┌────────────────┐│
│  │ PHONE  │    │ +1 345-678-9012││
│  └────────┘    └────────────────┘│
└─────────────────────────────────┘
```

FIG. 5

```
                                                    ┌─ 602
┌─────────────────────────────────┐
│  USER INFORMATION               │
│                                 │
│  USERNAME       ┌──────────────┐│
│                 │ AXB1023      ││
│                 └──────────────┘│
│  DATE OF BIRTH  ┌───────────┐   │
│                 │ 1/2/1980  │   │
│                 └───────────┘   │
│  PHONE          ┌────────────────┐
│                 │ +1 098-765-4321│
│                 └────────────────┘
│                                 │
│  CONTACT US     ┌────────────────┐
│  PHONE          │ +1 345-678-9012│
│                 └────────────────┘
└─────────────────────────────────┘
```

FIG. 6A

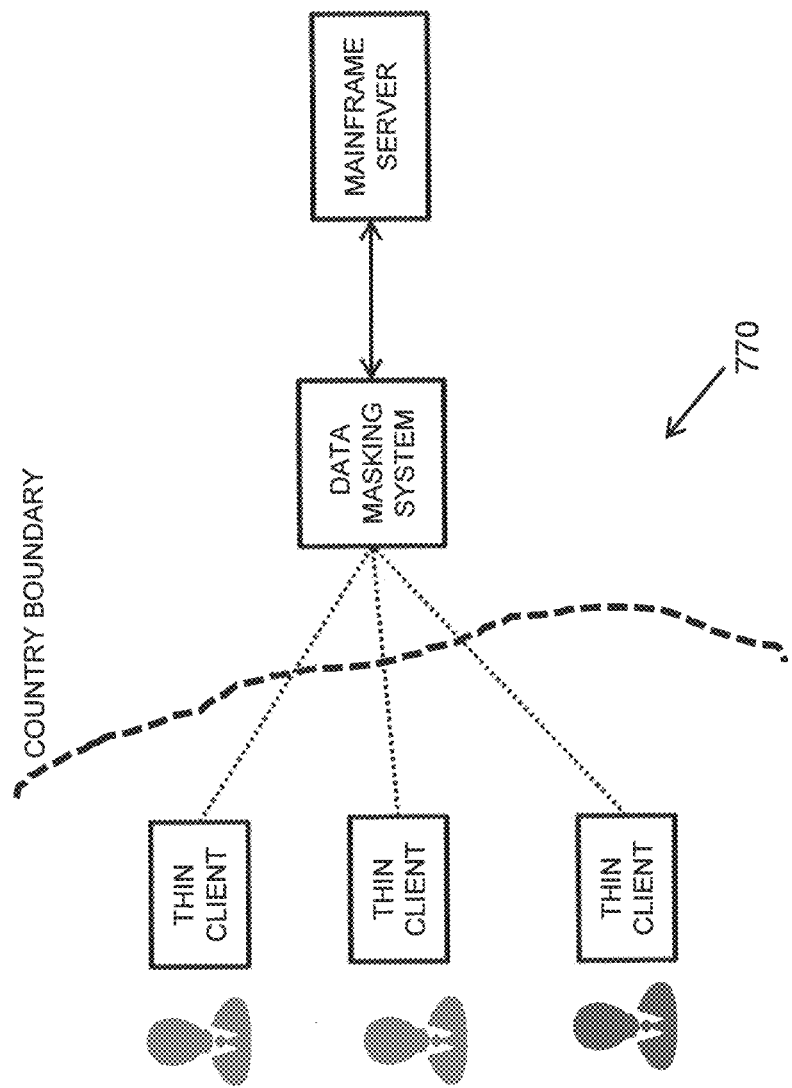

DYNAMIC DATA MASKING FOR MAINFRAME APPLICATION

PRIORITY CLAIM

This U.S. patent application claims priority under 35 U.S.C. § 119 to: India Application No. 829/MUM/2015, filed on Mar. 13, 2015. The entire contents of the aforementioned application are incorporated herein by reference.

TECHNICAL FIELD

This disclosure relates generally to data masking, and more particularly to method and systems for dynamic data masking for mainframe applications.

BACKGROUND

In recent years, organizations have become dependent on mainframe systems for data storage and data communication. Mainframe systems support seventy to eighty percent of the world's corporate data. At times, said data may consist of personal or private sensitive data such as SSN, credit card numbers, bank account numbers, transactional history and so on.

With the growing number of users accessing the mainframe systems, the chance of unauthorized access of data has also increased. Exposure of the data to an unauthorized user may have a risk of breach to security of the data. Various mechanisms and security control measures are available through which it is possible to restrict unauthorized access to said data. There are scenarios where an individual, for example, an associate employed at the corporate organization may have privileges to view the data having restricted content for accomplishing job related activity thereof. A corporate setup involving privileges given to certain individuals to access restricted content can create a problem. For example, there may be scenarios where said associate may access a part of the restricted content with malicious intentions, and not for job related activity, and hence there is possibility of data leakage. In order to protect sensitive data from being disclosed to authorized users, organizations generally implement data masking techniques for dispensing data on a need-to-know basis. Data masking technique involves masking sensitive data to hide the sensitive data from less privileged or unauthorized users.

Currently, it is possible to implement a data masking solution at multiple locations. For instance, in a proxy-based solution, a masking module may reside at a mainframe server, as proxy server or at client side. Said masking module may enable masking of data while sending the request or receiving a response. However, the data masking based on proxy based solutions may have certain limitations. For example, the proxy based solution face challenges to understand a communication over secured socket (SSL) enabled telnet or any other appropriate secured protocol. Also, in case of a shared mainframe account, if there are any changes being made to the any of the fields of mainframe applications, it may not be possible to track such changes and also the authors making such changes. In addition, a proxy based solution may not be effective to support role based data masking as the data stream between the client and the mainframe server doesn't carry information regarding the same. Moreover, it may be challenging and complex to implement a data restore utility while submitting the data back to the server in a concurrent access to the mainframe. The known data masking solution for mainframe uses pattern matching for detection and masking of sensitive content which in itself is prone to failure by over masking. Terminal emulators are utilized to access the applications installed on the mainframes, thereby providing an interface to access the sensitive data on said applications. Emulator displays the screen of legacy mainframe application and allows users to input data to said applications.

SUMMARY

Embodiments of the present disclosure present technological improvements as solutions to one or more of the above-mentioned technical problems recognized by the inventors in conventional systems. For example, in one embodiment, a processor-implemented method executed by a computing device for dynamic masking data is provided. The dynamic data masking may be associated with a mainframe application hosted on a mainframe server. The computing device includes one or more hardware processors and one or more memories. The method includes receiving, via the one or more e hardware processors, a request to access a mainframe application from a user profile. The user-profile is associated with a user and comprising identity information of the user attempting to access the mainframe application. An authentication status of the user profile is valid. Further the method includes, fetching, via the one or more hardware processors, a role assigned to the user-profile from a roles-repository. The role associated with the user-profile defines one or more rights to access information from the mainframe application. Also, the method includes initiating, via the one or more hardware processors and corresponding to the request. An access session with the mainframe server for accessing the mainframe application. Moreover, the method includes receiving, via the one or more hardware processors and corresponding to the access session, a screen comprising a plurality of fields. One or more field of the plurality of fields comprises sensitive data associated with the mainframe application. Moreover, the method includes identifying, via the one or more hardware processors, uniqueness in the screen corresponding to the session from the mainframe application. Identifying the uniqueness comprises determining contextual information associated with the plurality of fields of the screen. Also, the method includes fetching, via the one or more hardware processors and from a rules repository stored in the one or more memories of the computing device, at least one rule corresponding to the screen based on the role. The at least one rule is indicative of the one or more fields of the screen to be masked. Also, the method includes masking, via the one or more hardware processors, the one or more fields of the screen based on the at least one rule and the contextual information associated with the one or more fields.

In another embodiment, a processor-implemented system executed by a computing device for dynamic masking of data associated with a mainframe application hosted on a mainframe server is provided. The system includes one or more memories and one or more hardware processors. The one or more memories are coupled to the one or more hardware processors, wherein the one or more hardware processors are capable of executing programmed instructions stored in the one or more memories to receive a request to access a mainframe application from a user profile. The user-profile associated with a user and comprises identity information of the user attempting to access the mainframe application. An authentication status of the user profile is valid. Further, the one or more hardware processors are capable of executing instructions to fetch, from a roles-repository, a role assigned to the user-profile, wherein the role associated with the user-profile defines one or more rights to access information from the mainframe application. Furthermore, the one or more hardware processors are capable of executing instructions to initiate, corresponding to the request, an access session with the mainframe server for accessing the mainframe application. Moreover, the one or more hardware processors are capable of executing instructions to receive, corresponding to the access session, a screen comprising a plurality of fields, wherein one or more field of the plurality of fields comprises sensitive data associated with the mainframe application. Also, the one or more hardware processors are capable of executing instructions to identify uniqueness in the screen corresponding to the session from the mainframe application, wherein identifying the uniqueness comprises determining contextual information associated with the plurality of fields of the screen. Also, the one or more hardware processors are capable of executing instructions to fetch, from a rules repository stored in the one or more memories of the computing device, at least one rule corresponding to the screen based on the role, the at least one rule indicative of the one or more fields of the screen to be masked. Also, the one or more hardware processors are capable of executing instructions to mask the one or more fields of the screen based on the at least one rule and the contextual information associated with the one or more fields.

In yet another embodiment, a non-transitory computer-readable medium having embodied thereon a computer program for executing a method for dynamic masking data associated with a mainframe application hosted on a mainframe server is provided. The method include receiving a request to access a mainframe application from a user profile, the user-profile associated with a user and comprising identity information of the user attempting to access the mainframe application, wherein an authentication status of the user profile is valid;

Further, the method includes fetching a role assigned to the user-profile from a roles-repository, wherein the role associated with the use profile defines one or more rights to access information from the mainframe application. Furthermore, the method includes initiating corresponding to the request, an access session with the mainframe server for accessing the mainframe application. Also, the method includes receiving, corresponding to the access session, a screen comprising a plurality of fields, wherein one or more field of the plurality of fields comprises sensitive data associated with the mainframe application. Also, the method includes identifying uniqueness in the screen corresponding to the session from the mainframe application, wherein identifying the uniqueness comprises determining contextual information associated with the plurality of fields of the screen. Also, the method includes fetching from a rules repository, at least one rule corresponding to the screen based on the role, the at least one rule indicative of the one or more fields of the screen to be masked. Also, the method includes masking the one or more fields of the screen based on the at least one rule and the contextual information associated with the one or more fields.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates an example representation of a screen of the mainframe server with visual marking according to some embodiments of the present disclosure.

FIGS. 6A-6C illustrates parsing and representation of data of a mainframe application according to some embodiments of the present disclosure.

FIG. 7B illustrates a browser based architecture for deployment of data masking system according to some embodiments of the present disclosure.

DETAILED DESCRIPTION

Figure 1:
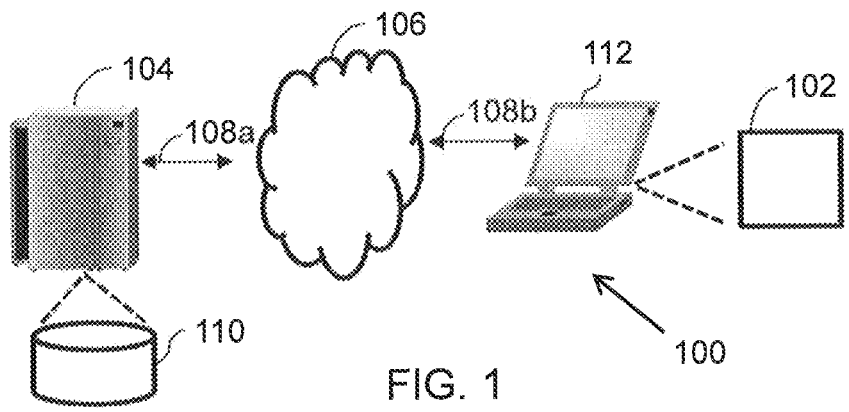
FIG. 1 illustrates a network environment implementing a data masking system for masking of fields of a mainframe application, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Organizations generally implement data masking techniques to mask sensitive data so that the sensitive data can be protected from being disclosed to authorized users and reveal only necessary information on need to know basis and as per minimum disclosure policy. For data masking, data elements (or fields) to be masked in an application, such as a mainframe application, are identified and then masked using suitable techniques. A variety of conventional mechanisms are available for identification of data elements that are to be masked. Hereinafter, the data elements that are to be masked may be referred to as sensitive data elements or sensitive data or sensitive fields or fields.

According to conventional techniques, the sensitive fields are identified based on matching of the data elements appearing on a screen or page of the application against a masking pattern. The masking pattern is checked throughout a screen or page of the application, and the data elements that matches with the masking pattern, are masked. However, this mechanism may fail to provide accurate results as all the data elements appearing on the screen page that match with the masking pattern are masked, irrespective of context of such elements. For example, a screen page may include a 16-digit account number and a 16-digit credit card number of a customer, and the masking pattern may be configured to mask the 16-digit credit card number. In this scenario, in case the masking logic is not able to differentiate between the 16-digit account number and the 16-digit credit card number, both the numbers may be masked. In certain other scenarios, the masking pattern may be user-defined. A user-defined masking pattern may contain malicious pattern, which may cause Denial-of-Service (DoS).

In recent years, due to increasing threat to security of the data, organizations are keen on implementing effective security and privacy policies for masking sensitive data. The security and privacy policies may be based on defining a role-based permission for each user or employee who is registered on a mainframe application. For instance, a manager of an organization may have permission to access and modify the sensitive data, whereas a trainee may not have the permission to access and modify the sensitive data. However, a scenario where all the users of an organization are not individually registered to the mainframe application, and instead said users share a common account to access the mainframe application, may lead to a situation where said users get tagged to same role or department or project. Also, such systems may not be effective in logging and tracking of activities of the users who are sharing the common account. Further, since the users may share a common account, logging and auditing is another challenge that is faced by organizations. It might not be possible for the organizations to track the changes made by different users and the users who are involved in making said changes. Moreover, current solutions of data masking deal with pattern-based masking of the data in read-only format, where data viewed by a user is masked. In a scenario where data is being masked and is sent again to the mainframe application for a subsequent request, masked value of the data is sent. In such scenario, the mainframe application may not be able to process the request or it may corrupt the data records, thereby possibly resulting in crash of the mainframe application. This problem is more prominent in a proxy based solution wherein concurrent users try to access the mainframe server.

The data masking technique, which uses network based solutions like masking through a proxy, may not be effective for those proxy based systems where communication happens over a secure layer, such as Secure Sockets Layer (SSL) and Secure Shell (SSH). For instance, if there is a secure communication between two network-based systems, such as an emulator and a mainframe server, then data transmitted between these systems will be in an encrypted format. As a result, it may become challenging to mask the encrypted data.

The present subject matter describes systems and methods for data masking that overcomes the limitations of conventional data masking techniques and systems described above. For example, various embodiments of the present disclosure allow data masking by integrating a data masking application with the mainframe application of the organization. In the disclosed solution, the system handles only the response coming from the mainframe server at the client side. The disclosed solution avoids any kind of inconsistency arising due to modification of a request and also does not waste any compute cycle on the mainframe server.

In an implementation, the data masking system may include hardware and software that may be collectively configured to host an Information Technology (IT) application for performing various functions pertaining to management of data privacy. In the foregoing discussion, said IT application for managing data privacy shall be termed as "data masking application". Accordingly, the terms "data masking application" and the data masking system can be used interchangeably throughout the description.

In an embodiment, said data masking system may impose restrictions on access of the sensitive data based on rules and context of the fields or data for which the access is requested. The system provides security and data privacy components for the mainframe applications. For example, the system includes an authentication layer for authenticating user attempting to access the data of mainframe application. Said authentication layer may be an additional layer that may be implemented using external systems such as Lightweight Directory Access Protocol (LDAP), due to which the user activities can be tracked based on current logon credentials of the users, and not with the credentials of mainframe applications. The authentication layer may therefore increases the security for mainframe applications. Additionally, the disclosed system enables finer role-based masking by allowing defining and allocation of roles and privileges such that data masking is performed as per the defined role. The system also provides context-based masking in which only a specific data field is masked from the list of similar fields on the same screen that satisfy the rule/instructions. The system provides mechanism for end-to-end masking of the data, meaning thereby, that the system masks the data based on which the masked data is replaced with actual value before the request is sent to the mainframe server, thereby saving the data integrity.

According to an implementation, the data masking system may receive a request to access an application on a mainframe server associated with an organization. The request may be received from a user who may be an employee of the organization. The application on a mainframe server may also be referred as a mainframe application. In response, the user is prompted to provide log-in credentials of the data masking system (or the emulator). The user may log in, for example, by entering login credentials, such as a user name and a password, specific to the user. The authentication status of the user is determined based on the login credentials of the user, by an external system that may be communicatively coupled to the data masking system. Thereafter, it is determined whether the user is authentic or not based on the login credentials.

Once the user is authenticated, an access session of the application is created and a role of the user is fetched from a data repository i.e. an appropriate rule file is fetched for the user and the emulator initiates a session with the mainframe server by automatically sending the actual username and password to the server, thereby, not disclosing the actual credentials to the user. In one example, the role of the user may be pre-defined by an administrator of the application and stored in the data repository. Thereafter, a screen pertaining to the application is received from the mainframe server. The screen may represent a single screen captured using the access session. On receiving the screen, the screen is uniquely identified and rules corresponding to the screen are fetched. The unique identification of screen is one of the major components in the proposed system. Said component identifies each screen or response uniquely, and then said component consults a rule file corresponding to the current user for any configured rule for the loaded page/screen. In case, a rule is configured for the loaded screen then further processing takes place, which includes parsing of the data stream, creation of intermediate representation, identifying sensitive context on the screen, and then masking the sensitive content. As it is evident from the description, uniqueness logic allows for performance optimization and selective processing of page or the screen for masking. For uniquely identifying a page or the screen, there are multiple possible techniques which can be used as per the target application. For example, a data viewing and reporting application may use relative location of static text on the screen or meta information associated with the screen or content, whereas a data entry application requiring masking of certain fields may use visual marking, dynamic content relative distance in an Euclidean plane of the screen or using label/context graph.

Further, it is determined whether any content appearing on the screen has to be masked or not. If it determined that a portion of the content has to be masked, then fields in the content are identified for masking. Subsequently, the rules are executed based on the role and the fields are masked. The fields may be masked using a masking technique. According to one implementation, context-based masking of the fields is performed. In one example, the context of the fields that are identified is determined and the fields are differentiated from similar fields appearing on the same screen. Thus, by performing context-based masking, a specific data field is masked from a list of similar fields on the same screen that satisfy the rule. An implementation of the data masking system is described further in detail with reference to FIGS. 1 through 8.

FIG. 1 illustrates a network environment 100 implementing a data masking system 102 for masking of fields of a mainframe application, according to an embodiment of present disclosure. The network environment 100 may be understood as a public or a private networking system. As shown, the network environment 100 may include the data masking system 102 coupled to a mainframe server 104 over a network 106 through one or more communication links 108a, 108b.

The network 106 may be understood as a network, including personal computers, laptops, various servers and other computing devices. The communication links 108a, 108b between the data masking system 102 and the mainframe server 104 are enabled through a desired form of communication, for example, via dial-up modem connections, cable links, and digital subscriber lines (DSL), wireless or satellite links, or any other suitable form of communication. Further, the network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, and Host Bus Adapters (HBAs) for providing a link between the data masking system 102 and the mainframe server 104. The network devices within the network 106 may interact with the data masking system 102 and the mainframe server 104 through the communication links 108a, 108b.

The mainframe server 104 may be associated with an organization or an institution. In an implementation, the mainframe server 104 may host an application through which a user, for example an employee of the organization, may request for data from a database 110 communicatively coupled to the mainframe server 104. The database 110 may store the data for the organization which deploys the mainframe server 104. Based on a user request, the mainframe application may query the database 110 for obtaining the requested data, processes the obtained data, and generates a response output for being sent to the data masking system 102. The data masking system 102 may monitor the response output for any sensitive data, and mask the sensitive data, as described in the description hereinafter with reference to FIG. 2.

The sensitive data may include, but not limited to the following categories, include Sensitive Personal information (SPI), Personal Health Information (PHI), Payment Card Industry Information (PCI), Document with PII, Design Documents, Patent Disclosure, Patent Application, Employee Record, Salary Information, Proprietary Source Code, Confidential Documents and domain specific data. Herein, the PII data may refer to the data that may be utilized for determining identity of the user. Examples of fields including the PII data in case of a finance application may include PAN number, date of birth, e-mail address, residential address, and mobile number. The domain specific data includes the data that can pose a risk or affect the user financially or otherwise, if disclosed in public. In an embodiment, the domain specific data may include domain specific fields, and can be generated by the organization. Examples of said domain specific data for a financial institution such as a bank may include financial information such as debit and/or credit card numbers, CVV number, account balance, card expiry date, and other such fields.

The data masking system 102 may be embodied in a computing device 112. Examples of the computing device 112 may include, but are not limited to, a desktop personal computer (PC), a notebook, a laptop, a portable computer, a smart phone, a tablet, and the like. The mainframe server 104 may be one, or combination of one or more, storage server or network server. In one example, the data masking system 102 may be embodied in a terminal emulator that may be utilized to access applications installed on the mainframe server 104. The data masking system 102 may provide an interface to users of the mainframe application to access data stored in the mainframe server 104. In an embodiment, the data masking system 102 may display a screen of the mainframe server 104 and allow the users to input data to the mainframe applications.

Although, it is shown that the data masking system 102 is external to the mainframe server 104. In an embodiment, the data masking system 102 may be embodied in the computing device 112, such as an emulator, which may enable CIAA (Confidentiality, Integrity, Availability, and Accountability) principles for host applications through various modules and components. The data masking system 102 provides security and data privacy components for mainframe applications. According to various embodiments of the present disclosure, the data masking system 102 enables fine role-based masking of data elements of the mainframe application based on defining and allocating roles and privileges to different users, such that data masking is performed as per the defined role. Additionally, the data masking system 102 provides context-based masking in which only a specific field is masked from amongst a plurality of similar fields on the same screen that satisfy specific rules and/or instructions defined for data masking. Moreover, the mainframe data masking emulator system 102 incorporates fine auditing features that allow activities to be mapped to a specific individual or user, especially in the scenario of shared account for mainframe applications. The data masking system 102 and functionalities of various components thereof are described further with reference to FIG. 2.

Figure 2:
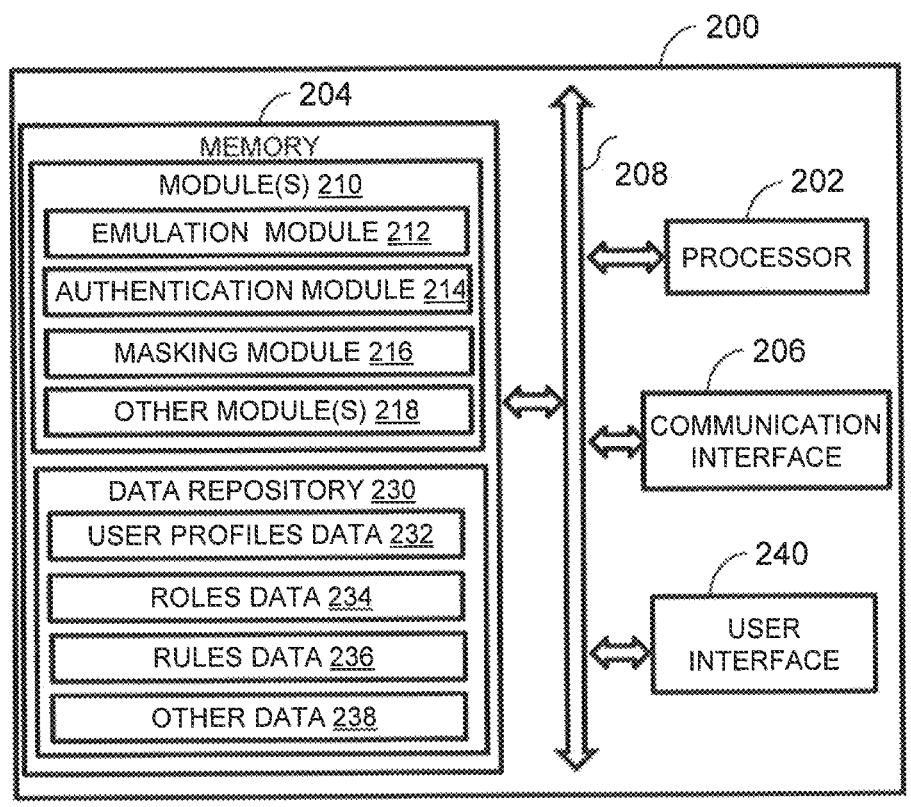
FIG. 2 is a functional block diagram of a system for data masking according to some embodiments of the present disclosure.

FIG. 2 illustrates a block diagram of a system 200 for data masking in accordance with an example embodiment. The system 200 may be an example of the data masking system 102 (FIG. 1). In an example embodiment, the system 200 may be embodied in, or is in direct communication with a computing device, for example the computing device 112 (FIG. 1). The system 200 includes or is otherwise in communication with one or more hardware processors such as a processor 202, at least one memory such as a memory 204, and a communication interface 206. The processor 202, memory 204, and the communication interface 206 may be coupled by a system bus such as a system bus 208 or a similar mechanism.

The at least one memory such as the memory 204, may store instructions, any number of pieces of information, and data, used by a computer system, for example the system 200 to implement the functions of the system 200. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system 200 to behave in a manner as described in various embodiments.

The memory 204 also includes module(s) 210 and a data repository 230. The module(s) 210 include, for example, an emulation module 212, an authentication module 214, a masking module 216, and other module(s) 218. The other modules 218 may include programs or coded instructions that supplement applications or functions performed by the data masking system 200. The data repository 230 may include user profiles data 232, role(s) data 234, rule(s) data 236, and other data 238. Further, the other data 238 amongst other things, may serve as a repository for storing data that is processed, received, or generated as a result of the execution of one or more modules in the module(s) 210.

Although the data repository 230 is shown internal to the data masking system 200, it will be noted that, in alternate embodiments, the data 230 can also be implemented external to the data masking system 200, where the data 230 may be stored within a database communicatively coupled to the data masking system 200. The data contained within such external database may be periodically updated. For example, new data may be added into the database and/or existing data may be modified and/or non-useful data may be deleted from the database. In one example, the data may be stored in an external system, such as a Lightweight Directory Access Protocol (LDAP) directory and a Relational Database Management System (RDBMS). In another embodiment, the data stored in the data repository may be distributed between the data masking system 200 and the external database. For example, the user profiles data 232 may be stored in the external database while the roles data 234, rules data 236 and other data 238 may be stored within the data masking system 200. For example the rules data may be stored in a rules repository within the data masking system 200.

The at least one processor such as the processor 202 may be implemented as one or more microprocessors, microcomputers, microcontrollers, digital signal processors, central processing units, state machines, logic circuitries, and/or any devices that facilitates in managing access to a financial account. Further, the processor 202 may comprise a multi-core architecture. Among other capabilities, the processor 202 is configured to fetch and execute computer-readable instructions or modules stored in the memory 204. The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The communication interface 206 is configured to facilitate communication between an organization (for example, a mainframe server 104 of the organization) and the system 200 (or the computing device 112 embodying the system 200). The communication interface 206 may be in form of a wireless connection or a wired connection. Examples of wireless communication interface 206 may include, but are not limited to, IEEE 802.11 (Wifi), BLUETOOTH®, or a wide-area wireless connection. Example of wired communication interface 206 includes, but is not limited to Ethernet.

In an example embodiment, a user interface 240 may be in communication with the processor 202. Examples of the user interface 240 include but are not limited to, input interface and/or output user interface. The input interface is configured to receive an indication of a user input. The output user interface provides an audible, visual, mechanical or other output and/or feedback to the user. In this regard, for example, the processor 202 may comprise user interface circuitry configured to control at least some functions of one or more elements of the user interface 240, such as, for example, a speaker, ringer, microphone, display, and/or the like. The processor 202 and/or user interface circuitry comprising the processor 202 may be configured to control one or more functions of one or more elements of the user interface 240 through computer program instructions, for example, software and/or firmware, stored on a memory, for example, the at least one memory 204, and/or the like, accessible to the processor 202.

In an embodiment, the data masking system 200 is implemented for masking sensitive data. According to an implementation, for the purpose of masking sensitive data, the system 200 may receive a request to access an application on the mainframe server. The application on the mainframe server may also be referred to as 'mainframe application'. In an embodiment, the request to access the application on the mainframe server is received at the emulation module 212. In one example, the request to access the mainframe application may be received from a user profile. Said user-profile may be associated with a user and may include identity information of said user attempting to access the mainframe application. In an embodiment, said user may be an employee of the organization associated with the mainframe server. In an embodiment, the emulation module 212 connects the user with the application on the mainframe server 104. The emulation module 212 may include an Application Program Interface (API) for enabling the user to interact with the mainframe server 104. The emulation module 212 may also provide for accessibility and automation which can help external or internal clients to provide features for automation and accessibility of the applications on the mainframe server 104.

In an embodiment, on receiving the request from the user profile for accessing the mainframe application, the emulation module 212 may prompt the user to log onto a page of the mainframe application. The user may log-in, for example, by entering a user credentials, for instance, name and a password. Based on the user credentials, the authentication module 214 may determine an authentication status of the user profile. In an embodiment, the authentication module 214 may determine the authentication status of the user profile by comparing the login credentials of the user profiles 232. The user profiles data 232 includes user profiles associated with a plurality of users. For example, the user profiles data 232 may include profile information of all or some users of the organization. In an implementation, the user profiles data 232 may be stored in the memory of the system 200. Alternatively, the user profiles data 232 may be stored in a remote repository communicably connected with the system 200. In this embodiment, the authentication module 214 may interact with the remote repository to authenticate the user profile based on the user profile data 232 stored within the external repository. In an embodiment, the authentication module may be implemented by an authentication layer. An implementation of the authentication layer consists of a remote privacy server having plurality of employee credentials and actual mainframe credentials. A user or a set of users are mapped with a single mainframe credential. For the brevity of description, the mapping between the user credentials and the mainframe application credentials is considered as one-to-one mapping and many-to-one mapping However, it will be noted that said mapping may include one-to-one mapping, one-to-many, many-to-one and many-to-one mapping. When a user accesses the privacy enabled mainframe emulator implementing the system 200, then user may be presented with a challenge-response login screen. User may provide their credential which is then validated on the external privacy server. In case of successful login, actual mainframe credential and the rule file is fetched for the role associated with the user. The rule file is then mapped with the user credentials. Once the rule and actual credentials are available to the emulator, the emulator initiates an access session with the mainframe session by providing the actual credentials of the mainframe application. Said session initiation is transparent to the user, as the user is not shown the actual values. Also, the initiation of the access session completely automated by sending actual credentials of the mainframe application as a data packet over the communication network.

Upon determining the authentication status of the user profile to be valid, the processor may initiate an access session corresponding to the request. An access session is a semi-permanent interactive information interchange between two or more communicating devices, herein between the emulator and the mainframe server. The access session can be set up or established at a certain point in time, and then torn down at some later point. An established communication session may involve more than one message in each direction. There are two major components of a session object, one is the session id, which identifies the connection during a given time period, and second, is the associated data or state which may consist of multiple entities like duration of access, associated rule file (or role), list of utilities/privileges available like printing or screenshot etc., history of commands fired for auto completion, any end user customizations like creation of hot keys for faster access to fields, audit trails and possibly include other details like system performance counter, memory profile, load, and so on. In the disclosed solution the emulator system 200 initiates at the very least a single session wherein the rule files may reside on the local system in encrypted form and loaded once the user starts the application/emulator. Often and in a desirable setup at least two session objects are created, one with privacy server for all the housekeeping, and second, with the mainframe server for accessing a desired application. It is also possible to have more than two concurrent sessions. For example, in case of a distributed login, rule and logging servers for housekeeping or a scenario, a single user account is mapped with two or more different mainframe accounts and may want to have concurrent access to two or more of them for their job activity. Sessions are also informative in case of simultaneous access request to same mainframe account. A person skilled in this art will appreciate that any session creation and access activity is directly mapped to the user and the associated role and hence the rule file, Also from the performance point of view it is essential to identify and associate a role with a session because in case of absence of one the emulator follow the policy of minimum disclosure and will try to analyze and mask all sensitive information using a master rule file or from the digest of all the created rule files. In an embodiment, the modules 210 may include an authentication module 214 that may initiate the access session. The authentication module 214 may fetch the role of the user using the role(s) data 234. The role(s) data 234 may include roles corresponding to the plurality of users profiles. The roles associated with the user-profile define one or more rights to access information from the mainframe application. In one example, the roles of the user profile may be defined or configured by an administrator of the mainframe application. The role for each user may be defined based on a unique identity of said user and not on application accounts. For instance, the mainframe application may be a legacy application and may not have roles for accessing it. Alternatively, the mainframe application may support few roles and multiple users may be mapped to one of said roles. Such as scenario may be possible in any service providing organisation where employees come in shifts. It is thus evident that dependence on the mainframe application or mainframe account for providing a unique identifying token for each mapped user is not a reliable solution. To accomplish effective data masking for mainframe application, the disclosed system has externalized the unique identity provider, and implemented it as part of privacy server. The various techniques that can be used for this purpose, for example, using corporate. LDAP credentials or email based id or creating database entry for username and password pair and associating a user with that. Each of the user profile may be allocated with specific roles having certain privileges. The administrator may define the roles and the privileges independent of the application. In one example, for a credit card processing application running on the mainframe server 104 intended to be employed within an organization, the users of the organization may be assigned different roles corresponding to their level of authority. For example, a user with a role 'Manager' may be given privilege to update the credit card information, a user with role 'Trainee' may be given privilege to view but not edit the credit card information, and so on.

Once the authentication module 214 fetches the role associated with the user profile, the emulation module 212 receives a screen from the mainframe server 104. The screen of the mainframe server 104 may represent a unique screen captured using the session. The emulation module 212 may identify a uniqueness of the screen. The uniqueness of the screen, along with the rule file for the active session, may be indicative of a contextual information associated with the plurality of fields of the mainframe application. In an embodiment, the contextual information may include context of the plurality of fields of the screen. The context may include position and relationship between the fields. For example, the context may include one or more of location and/or distance of static fields of the screen, meta information such as cursor position, color, blink rate, and so on. According to one example, for identification of the uniqueness of the screen, the emulation module 212 may initially identify components present on the screen. The components may include static components and dynamic components. To identify the components, the emulation module 212 may parse the screen and compare each component of the screen with a pre-populated list of invariants.

Based on the comparison, the emulation module 212 may tag each component of the screen as a static component or a dynamic component. In one example, the emulation module 214 may prompt the user to mark the components as static or dynamic component. In an example embodiment, the components may be tagged using a highlighter to identify the static components of the screen. The identification of uniqueness of the screen is described further in detail with reference to FIGS. 3A-3B.

Upon uniquely identifying the screen, the emulation module 212 fetches at least one rule corresponding to the screen. The emulation module 212 may fetch the rules from the rule(s) data 236. The rules may be fetched to identify fields of the screen to be masked and define masking logic. The rules stored in the rule(s) data 236 may be validated for errors and malicious pattern. Subsequently, the emulation module 212 may parse the rule and identify fields of the screen for which the rule is configured. The masking module 216 executes the rule based on the role of the user profile. Based on the execution of said rule, the masking module 216 masks the identified fields based on context. Herein, it will be understood that although masking of the fields is described to be based on the role of the user, however, in alternate embodiments, the fields may also be masked based on other attributes, such as time, geographical location, day, Internet Protocol (IP) address, and the like.

In one implementation, the masking module 216 stores intermediate state information to perform a context based masking. The intermediate state information includes contextual information associated with context of the plurality of fields of the screen. Said context includes position and relationship between the plurality of fields. In an embodiment, intermediate state information further includes actual values of the one or more fields of the screen. In an embodiment, the actual values of the one or more fields are masked at a display component of the computing device. The masking module 216 may determine the context and differentiate similar fields in a particular screen or data packet. In an embodiment, to determine the context, the masking module 216 may receive the screen from the emulation module, and may parse the data associated with the screen to formulate a logical tree-like structure. The masking module may keep an anchor to traverse through the tree-like structure. The relationship between the data elements on the screen is required to determine the context and differentiate similar fields in a particular screen or data packet. An example of differentiation of the similar fields on the screen and a corresponding data packet are described with reference to FIGS. 6A-6C.

In an embodiment, the emulation module 212 may log a plurality of user activities associated with the request and the subsequent request to access the mainframe application. Examples of such activities may include, but are not limited to, typing, editing, clicking, and the like performed by the user on the application. The emulation module 212 may map an activity with the application login and user unique identity, which may be retrieved from the user profiles data 232. Therefore, even if credentials of the applications are shared across a group of users, auditing of the user activity may be feasible using the user unique identity.

Further, the emulation module 212 may allocate a privacy budget to each user-profile where users are allocated points to access sensitive information. The privacy budget is a virtual currency which can be in the form of reputation points or other fungible entity. A user may earn this virtual currency by correctly, responsibly and timely operating upon a query or using an application. A higher value of the privacy budget may be indicative of a trusted and experienced user, whereas a lower value of said privacy budget may reflect a new operator or suspectable behaviour. By implementing the privacy budget, the system 200 is capable of introducing intelligence into the data masking technique for advocating good behaviour and a mechanism for detecting outliers.

The privacy budget also helps in case of an exceptional scenario where some content is masked on the screen but same content is needed by the user to operate correctly and efficiently. For example, in one instance a user may want to view a sensitive field like email address of a customer to communicate, the user can initiate an exceptional scenario workflow with appropriate comment for access to the email address. The system does automated analysis based on the user's current reputation, possible impact in case of sensitive data theft, user's performance in last few sessions and other factors. Based on the outcome, the system may decide to approve or disapprove this exceptional workflow. In case of approval by the system, a portion of virtual currency (assigned as a part of the privacy budget to the user) can be deducted from the user's current balance. An advantage of implementing the privacy budget in the system is that it facilitates in stopping any major loss and discourage user and the workflow from having such exceptional flows. Also, in case of disapproval, the system logs such disapprovals and reports the same to the higher authority (for example, a supervisor or appropriate person in the hierarchy or workflow). In second scenario, a user may have updated certain fields, for example, email address or PAN number. Again, the user is supposed to initiate an exceptional workflow, system may do the analysis and accordingly approves or disapproves the request. Depending on the urgency of the update into the actual database, the user may want to wait for his supervisor to approve the correction/update or commit it as soon as possible. In first scenario the user can be refunded a major part of the spent currency.

The system 200 may associate respective scores with the one or more fields of the mainframe application for accessing the information associated with said field. The system 200 may deduct scores equal to the respective score from the privacy budget upon the access to the one or more fields. In an embodiment, the respective scores allocated to the fields may be proportional to the sensitivity of the data accessed. The system 200 may reimburse the points based on various mechanisms. In an embodiment, the system 200 may evaluate the user profiles based on the scores accumulated by the respective users.

Figures 3A, 3B:
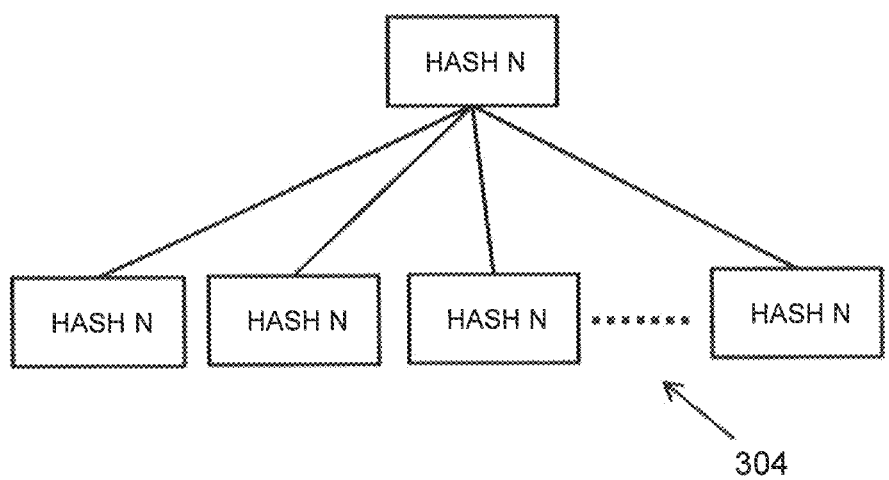
FIG. 3A illustrates an example screen received from a mainframe server according to some embodiments of the present disclosure.
FIG. 3B illustrates an example an example traversable tree-structure for storing data associated with fields of mainframe application according to some embodiments of the present disclosure.

FIG. 3A illustrates an example screen 302 received from a mainframe server, for example the mainframe server 104 in accordance with an example embodiment. The screen 302 may be received at the computing device, for example the computing device 112 in response to a user query to access information from the mainframe server. In an embodiment, the screen 302 may be a unique screen since the screen may be associated with role of the user requesting to access said screen 302. The screen 302 in the present embodiment is shown to include user profile information and other information. The user profile information may include sensitive data corresponding to the user profile. In the present example, the user profile information on the screen 302 is shown to include a phone number, username, and user's date of birth. Also, the other information is shown to include a 'contact us' field including another phone number.

In an embodiment, in order to perform a task, such as data masking, which is specific to the screen of the mainframe application, the uniqueness of the screen is identified. The disclosed system, for example the system 200 (FIG. 1) is capable of identifying the uniqueness of the screen of the mainframe to perform the said task. Various embodiments of the present disclosure provide methods to identify the uniqueness of the screen.

In one embodiment, in order to identify the uniqueness of the screen 302, the system 200 determines contextual information associated with the plurality of fields of the screen. In an embodiment, said contextual information the screen 302 may be identified by uniquely identifying the fields of the screen 302 as static and dynamic components. In an embodiment, the data associated with the plurality of fields of the screen 302 is parsed to form fragments of data to identify relationship between the pluralities of fields. In an embodiment, the screen 302 is parsed and each component of the screen is compared with a plurality of components pre-calculated in an invariant list. Based on said comparison, each of the components of the screen is tagged as one of a static component and a dynamic component. In another embodiment, the system 200 may cause masking of the components of the screen as the static component and dynamic component based on a user input. In an embodiment, said components can be tagged using a highlighter in the system. The highlighter tool helps a system administrator in highlighting different components on the emulator screen and assist administrator in rule creation. In an embodiment, the emulation module 212 of the system 200 is adapted to identify the static and the dynamic components of the screen 302. In the present example, the static components can be represented as:

Static components: {C1user, C2username, C3DOB, C4phone, C5contact_us, C6phone}.

In an embodiment, the fragments of the data are systematically stored in a traversable structure. In an embodiment, systematically storing the fragments of the data facilitates in determining the contextual information and differentiates similar fields of the plurality of fields present in the screen. In an example embodiment, the traversable structure 304 may be in form of a hash tree, as illustrated in FIG. 3B. Said traversable structure can facilitate in identifying the uniqueness of the screen 302. In an embodiment, the emulation module 212 may be caused to create a single depth Merkle Tree, by calculating the hash for every static component per line. Further the emulation module 212 may calculate the hash of all the static components in the entire screen to be a root of the tree. For example, if there are R lines, then the set of hash for each line is represented as:

{Hash L1, Hash L2 . . . Hash LR}.

Thereafter, the hash of complete static set is calculated, i.e., Hash N and a single depth tree with root Hash N is created.

Referring to FIG. 3B, an example representation of a single depth tree 304 having a traversable structure with root Hash N, is illustrated. Herein, Hash L1, Hash L2, . . . Hash LR represents the hash of the lines 1, 2, . . . R, respectively. In an embodiment, the emulation module 212 identifies the identity of the screen using the complete tree. If there is a change in the screen, a root node i.e. Hash N may change. To detect the line at which the change is occurred, the emulation module 212 may compare leaf nodes of the tree.

In another example embodiment, the emulation module 212 may compute a graph of the screen to identify the uniqueness of the screen 302. The identification of the uniqueness of the screen 302 based on the graph of the screen 302 is described further with reference to FIGS. 4A and 4B.

Figures 4A, 4B:
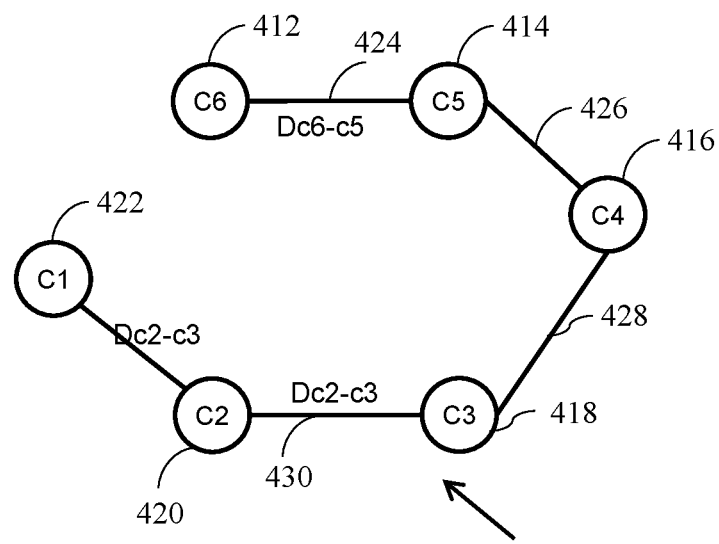
FIGS. 4A and 4B illustrates a screen of mainframe application, and a graph generated corresponding to the screen, respectively according to some embodiments of the present disclosure.

Referring now to FIGS. 4A and 4B, identification of the uniqueness of a screen based on a graph of the screen is described in accordance with an example embodiment. As illustrated in FIG. 4A, a screen 402 of the mainframe application is presented. In an embodiment, to identify the uniqueness of the screen, the emulation module 212 may compute the graph, for example, a graph 410 (FIG. 4B) of the screen 402 with vertex being the static component set. The graph may be represented as G (V, E), where V represents static set label information and coordinates and E represents coordinate distance. The graph may include a plurality of vertices, for example, vertices 412, 414, 416, 418, 420, and 422. vertex pairs of the plurality of vertices therebetween. For example, vertex pair 412-414 includes an edge 424 therebetween, vertex pair 414-416 includes an edge 426 therebetween, vertex pair 418-420 includes an edge 428 therebetween, vertex pair 420-422 includes an edge 430 therebetween, and so on.

An edge of the graph 410 may be weighted using the coordinate distance between vertexes. The coordinate distance may be calculated based on equation (1) provided below:

$$D = \sqrt{(x2-x1)^2 + (y2-y1)^2}$$

Equation (1)

The vertex may be represented a
"Vertex: {C1user, C2username, C3DOB, C4phone, C5contact_us, C6phone}", and Edge as "Edge: {Dc1-c2, Dc2-c3 . . . DC6-C5}".

The edges of the graph may be determined using various techniques. In one embodiment, a neighboring vertex may have an edge whose weight is the distance between the vertices. In another embodiment, an edge may be formed between two vertices based on a distance between said vertices. In this embodiment, a threshold value for the distance may be identified. If value of the distance is between the edges is determined to be below the threshold value between the two vertexes, the edge may be formed between them. A vertex includes label information with the coordinates of the components. To identify a screen, the emulation module 212 may populate a similar graph using the coordinate distance and labels. The screen can be uniquely identified based on comparison of graph G' (V', E') with the graph G (V, E) and the weights. Herein, the threshold value for the distance may be determined by initially associating a random value between a range, and thereafter updating said value to minimize any error in recognition.

According to yet another example, the emulation engine 212 may identify the uniqueness of the screen based on visual marking. In one example, the emulation engine 212 may mark static content of the screen which is not subjected to change on the screen. In another example, the user marks the static content which is not subjected to change on the screen, FIG. 5 illustrates an example representation of the screen of the mainframe server 104 with visual marking. The emulation module 212 may store the marking as a unique identifier of the screen. In one example, the emulation module 212 may identify the screen using image processing. The emulation module 120 may compared markings with marking obtained in configuration to uniquely identify the screen. In another example, the emulation module 120 may capture visual attributes of the screen, such as brightness, color, fonts, and pictures to uniquely identify the screen.

As discussed with reference to FIG. 2, the masking module 216 stores an intermediate state to perform a context based masking. The masking module 216 identifies the field correctly from the similar fields. According to said implementation, the masking module 216 may determine the context and differentiate similar fields in a particular screen or data packet. Example of differentiating the similar fields of a screen is described with reference to FIGS. 6A-6B.

Figures 6B, 6C:
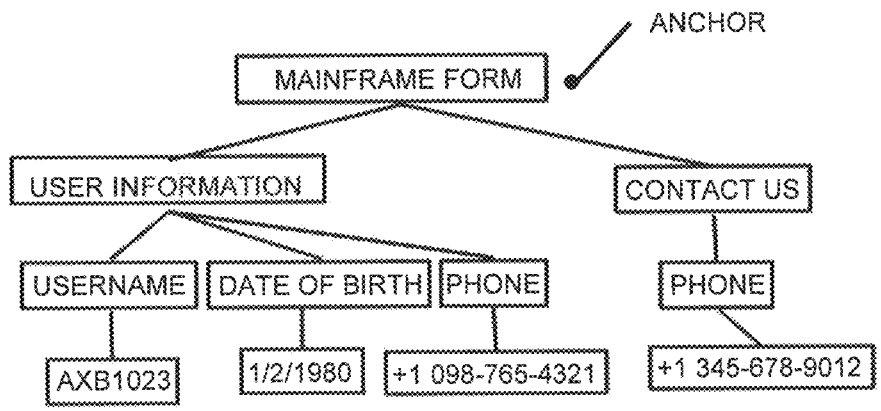

Referring to FIG. 6A, a screen 602 associated with the mainframe application is depicted. As is seen, the screen 602 includes two phone numbers, out of which one number belonging to the user is to be masked. In one embodiment, the decision to mask a field may depend on a value of other field which is similar to said field. The emulation module 212 may pass a stream of data to the masking module 216 for masking the data. The masking module 216 may mask the data by parsing the data associated with the screen. The data may be presented in form of a data stream, as described further with reference to FIG. 6B.

Referring to FIG. 6B, the data 610 associated with the screen 602 is presented, in accordance with an example embodiment. The masking module 216 may parse the data and formulate a logical tree-like structure. The masking module 216 may further form a plurality of fragments of data associated with the fields of the screen. The masking module 216 may further identify the relationship of the fields, and store the same in a tree-like structure. The relationship of the fields is identified and is stored in a tree-like structure. An anchor is maintained to traverse though the fields. An example tree-like structure for storing the data is described further with to FIG. 6C FIG. 6C illustrates an example representation of a logical tree-like structure 620 of the screen 602 for data masking, in accordance with an example embodiment. Using the tree-like structure 620, the masking module 216 performs data masking based on patterns and the context at the time of data masking. Since the intermediate representation information is held in such a structure, which can be traversed using the anchor, masking based on the other field can be performed. The masking module 216 may store the fields based on pattern (matching patters associated with field of data) and context associated with said fields. For example, in FIG. SC, the tree-like structure 620 is shown to include a first level of the tree having two branches. 'user information' and 'contact us' fields. The user information field and the contact us are further branched into a plurality of other fields in the second level of the tree. For example, the 'user information' field is branched into fields, namely, user name, date of birth, and user's phone number. The contact us field is shown to include a phone number. In this example, the context associated with the two phone numbers is different. For example, the context associated with the phone number in user information branch is that said phone number is associated with the user, while the context associated with the phone number in the contact us branch is that said phone number is not associated with the user. Based on the matching of patters (for example, 16 digit numbers) and also on the context, similar fields can be compared to identify the fields that are to be masked.

In certain scenarios, the fields that are masked may have to be again accessed. For example, the system 200 may receive a subsequent request to access said fields such that the subsequent request is a write request. Herein write request may imply that the subsequent request may be from a user for allowing the user to write the value for the data associated with said fields. In such scenarios, if the masked data is resubmitted at the mainframe server, then it may lead to errors. In order to prevent the re-submission of the masked data in the request, the masking module 212 maintains intermediate representation information associated with the fields of the screen. The intermediate representation information may include contextual information associated with context of the plurality of fields of the screen. Herein, the context includes position and relationship between the plurality of fields of the screen. The intermediate representation information may further include actual values of the one or more fields of the screen. In other words, the intermediate representation information may include shadow copy of a sensitive value. Said actual values of the one or more fields are masked at a display component of the computing device. In an embodiment, when a screen or data is submitted for processing, for example, during the subsequent request, said shadow copy is used for retrieving actual value, the masked value of the field is replaced with the actual value. At the time execution of the rule, the mapping of actual values may be stored in a secured buffer.

In an example embodiment, the actual values of the data may be stored in form of key-value pairs. A key of the key-value pair may include an identifier of the field to be masked. In another embodiment, the key of the key-value pair may include a function F(x) which generates a unique key for the field based on relative position. The function is facilitated to generate the key based on the relative position of the field. Said key can be used to store the actual value in a private buffer in a key-value pair data structure. On re-submission, the masking module 212 may restore the actual values by directly modifying in-memory location of sensitive component.

In an embodiment, the emulation module 216 may provide an API and set of accessibility features that make it easier for the users with disabilities to use computers. The API act as providers where a client can use the API to communicate with different components on the screen of the mainframe server 104. This helps in making application's user interface more accessible to many users with vision, hearing, or motion disabilities. Further, the API helps to automate mundane task in the applications. It provides robust functionality for automating certain task and to perform automated testing. Through these API, the user can get meta-information about the components on the screen and can trigger events on them. The data masking system provides mechanism for end-to-end masking, which replaces the masked data with the actual value before the request is sent to the mainframe server 104, thereby saving the data integrity. Moreover, context-based masking is performed in which a specific data field is masked from the list of similar fields on the same screen that satisfy the rule.

Figure 7A:
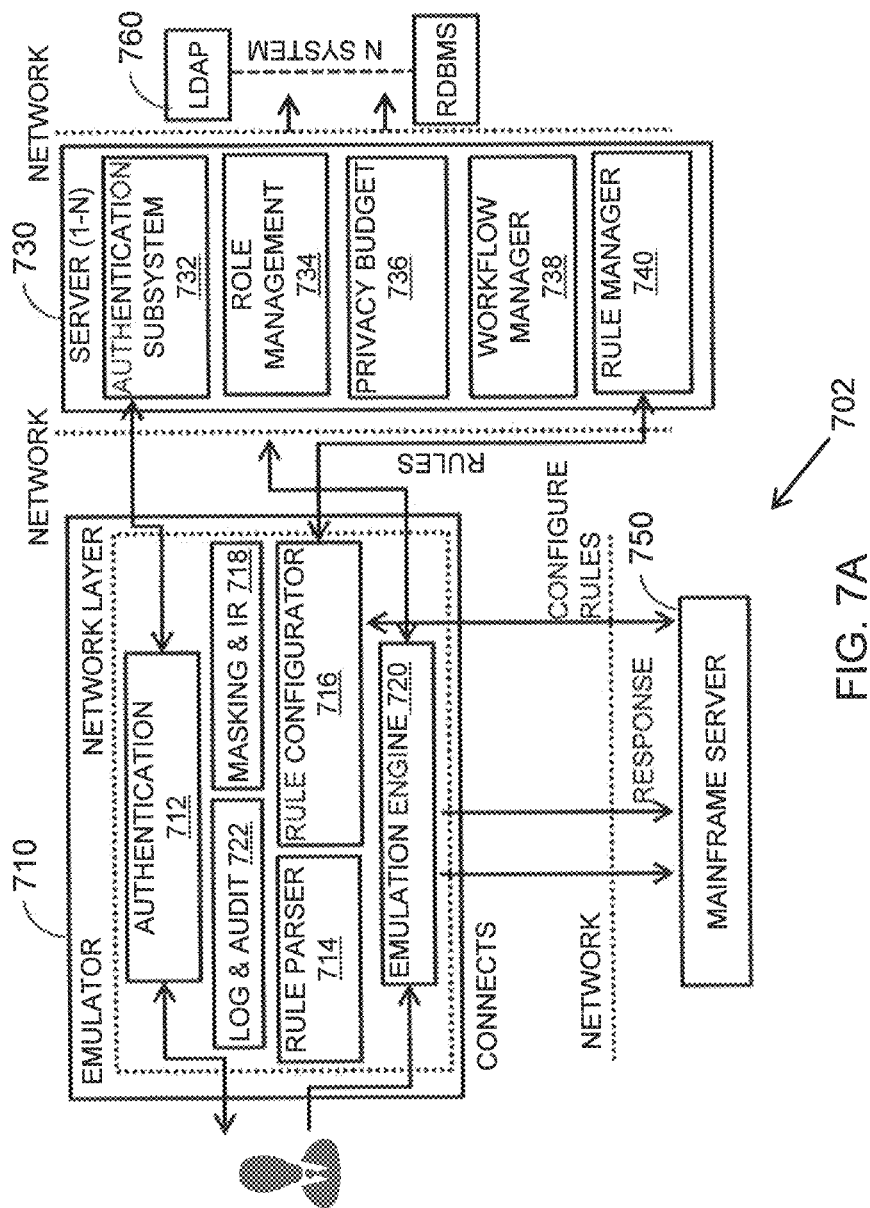
FIG. 7A illustrates a client-server framework for the deployment of data masking system according to some embodiments of the present disclosure.

FIG. 7A illustrates architecture for deployment of data masking system, for example, the data masking system 200, in accordance with an embodiment of the present disclosure. For example, FIG. 8A illustrates a client-server framework 702 for the deployment of the data masking system 200. The framework 702 is shown to include the emulator system 710, one or more server such as server 730, a mainframe server 750 and an external system for example an external system 760. In an embodiment, the emulator system 710 may be an example of the system 200 (FIG. 2). In an embodiment, the system 200 may be embodied in an emulator. In an embodiment, the emulator system 710 may be a thick client installed on a user machine.

The (1-N) server 730 may communicates with the emulator system 710 and (1-N) external systems 740. To access the emulator system 710, user may enter user-credentials in a login screen for which an authentication subsystem may be setup. An authentication component 712 may relay the credentials to the authentication subsystem component 732 of the sever 730. The authentication subsystem 722 may query the external systems 760, and return a session token for an access session and fetches a role of the user. The role of the user may be retrieved by a role management component 734 of the server 730. The authentication component 712 may create the access session and the emulator system 710 may fetch a screen of the mainframe application from the mainframe server 750. As the response of the mainframe application reaches the emulator system 710, the emulator system 710 may trigger a rule parser 714 for, fetching from a rule configurator 716, a rule configured for a response from the server. The rule parser 714 may parse the rule and identify fields for which the rule is configured. In an embodiment the server 730 may include a rule manager 740 for management of rule related functionalities at the server 730. Thereafter, a masking and the intermediate representation (IR) component 718 may identify the fields to be masked from the list of similar fields, if any. The masking and the intermediate representation (IR) component 718 may execute the rule based on the role of the user and masks the identified field. The emulation engine 720 may then send the masked response to the user. In a scenario, where an event is triggered and masked content is a part of the request, the emulation engine 720 may unmask the value before sending the value to the mainframe application, thereby saving the integrity of the database.

A log and audit component 722 logs all the activities of the user and sends it to the server which can be persisted in the external systems. The emulation engine 720 may also communicate with a privacy budget component 736 and restricts the user to view a certain amount of sensitive information based on the points in his account. The user may also trigger workflow manager component 738 through the emulation engine 720 to raise a ticket, if the user wants to access a masked data which can be resolved by an administrator of the mainframe application.

Referring now to FIG. 7B, an architecture for deployment of data masking system, for example, the data masking system 200, in accordance with another embodiments of the present disclosure. For example, FIG. 7B illustrates a browser based architecture 770 for the deployment of the data masking system 200. The browser based architecture 770 includes a plurality of components that may reside on (1-N) servers, which communicate with the mainframe application. A user may access a masking agent through a web browser. In countries where data privacy policy states that sensitive information should not leave a geographical boundary, the browser based framework may be deployed for data masking. In such a scenario, server may be deployed in a country's geographical boundary, which may mask the sensitive data before the data is sent across.

Figure 8:
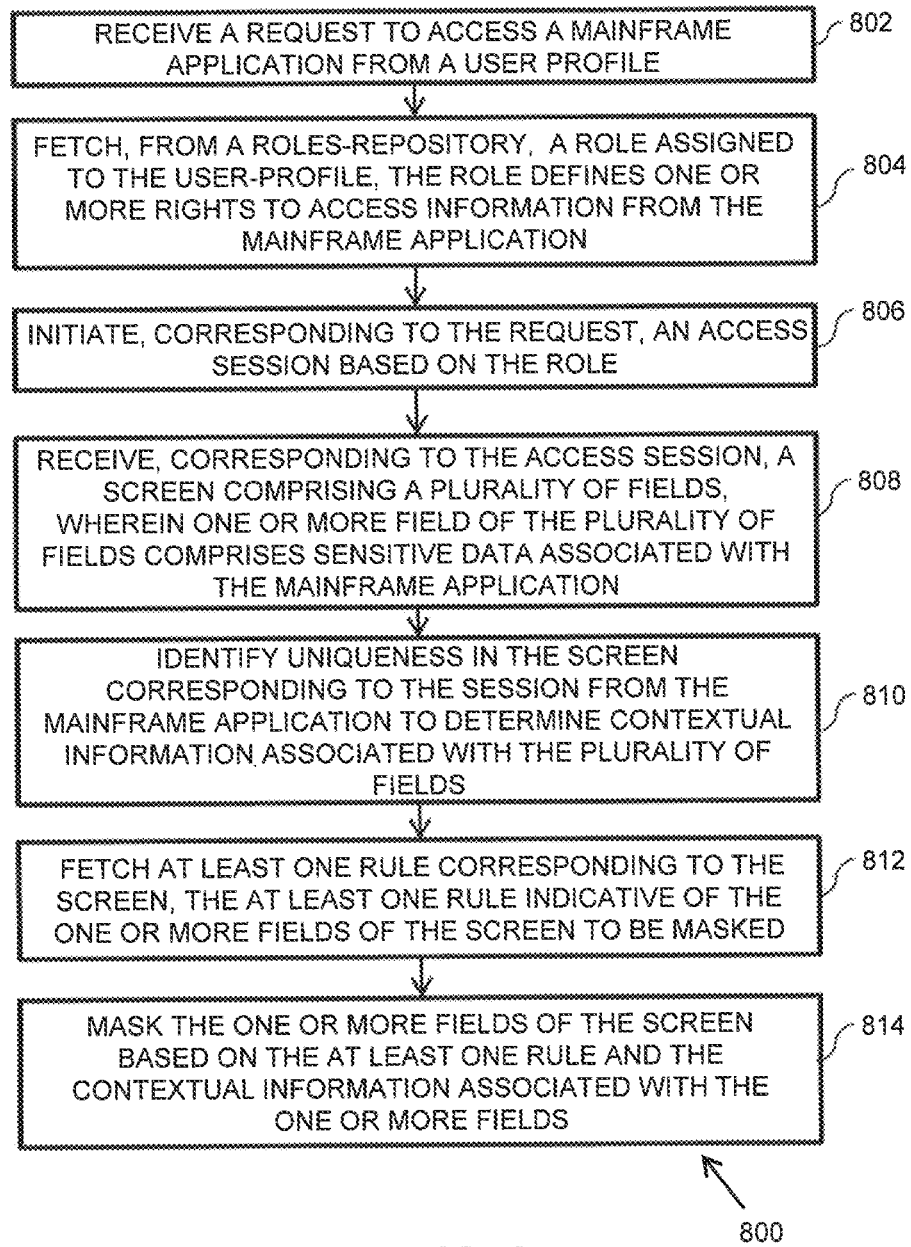
FIG. 8 illustrates a flow diagram for a method for data masking according to some embodiments of the present disclosure.

FIG. 8 is a flow diagram depicting an example method 800 for data masking, in accordance with an example embodiment. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communication network. The order in which the method 800 is described is not intended to be construed as a limitation, and any number of the described method blocks can be combined in any order to implement the method 800, or an alternative method. Furthermore, the method 900 can be implemented in any suitable hardware, software, firmware, or combination thereof.

In an embodiment, the method 800 depicted in the flow chart may be executed by a system, for example, the system 200 of FIG. 2. In an example embodiment, the system 200 may be embodied in a computing device, for example, the computing device 112 (FIG. 1).

At 802, the method includes receiving a request to access a mainframe application from a user profile. In an embodiment, the request may be received at a hardware including one or more processors and one or more memory devices effecting a computing device, for example the computing device 112. In an embodiment, the user-profile may be associated with a user and may include identity information of the user attempting to access the mainframe application. In an embodiment, an authentication status of the user profile is valid.

In an embodiment, the user profile may be authenticated by connecting the computing device to an external server. The external server may include pre-stored user data having authentication status of a plurality of user-profiles. Once the user attempts to log-in to the mainframe application, the computing device may connect with the external system to determine the authentication status of the user profile. On determining the authentication status of the user-profile to be valid, the system generates an access session corresponding to the request.

At 804, the method 800 includes fetching, from a roles-repository, a role assigned to the user-profile. In an embodiment, the roles associated with various user-profiles may define one or more rights to access information from the mainframe application. At 806, the method 800 includes initiating an access session corresponding to the request. In an embodiment, the access session may be initiated based on the role assigned to the user. At 808, the method 800 includes receiving a screen from the mainframe application corresponding to the access session. The screen may be a unique screen having a plurality of fields such that one or more field of the plurality of fields includes sensitive data associated with the mainframe application.

At 810, the method 800 includes identifying uniqueness in the screen corresponding to the session from the mainframe application. Uniqueness helps to determine which rules needs to be fetched and applied for masking the data. The uniqueness in the screen is identified by determining contextual information associated with the plurality of fields of the screen. Various embodiments describing techniques to identify uniqueness of the screen are described with reference to FIGS. 3A-5B. At 812, the method 800 includes fetching, from a rules repository stored in the one or more memories of the computing device, at least one rule corresponding to the screen. The at least one rule is indicative of the one or more fields of the screen to be masked. At 814, the method 800 includes masking the one or more fields of the screen based on the at least one rule and the contextual information associated with the one or more fields.

In an embodiment, the method further includes configuring an intermediate representation information. The intermediate representation information includes contextual information associated with context of the plurality of fields of the screen, and actual values of the one or more fields of the screen.

Various embodiments provide method and system for dynamic data masking in mainframe applications. The proposed system is a privacy enhanced emulator for the mainframe applications. The disclosed system is capable of intelligently and securely masking data of the mainframe application. Important components of the system are security and data privacy components for mainframe applications. The system provides mechanism for end-to-end masking, which replaces masked data with actual value of data fields before the request is sent to the mainframe server, thereby saving the data integrity. The system adds an authentication layer using external systems, which increases the security for mainframe applications. Moreover, the system enables finer role-based masking by allowing administrators to define and allocate roles and privileges such that data masking is performed as per the defined role. It provides context-based masking in which only a specific data field is masked from the list of similar fields on the same screen that satisfy the rule/instructions. Finer auditing features allows activities to be mapped to a specific individual, especially in the scenario of shared account for mainframe applications.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method executed by a computing device for dynamic masking data associated with a mainframe application hosted on a mainframe server, the method comprising:

receiving, via one or more hardware processors comprised in the computing device, a request to access a mainframe application from a user through a user-profile associated with the user and comprising identity information of the user attempting to access the mainframe application, wherein an authentication status of the user profile is valid;

retrieving, via the one or more hardware processors, a role assigned to the user-profile from a roles repository, wherein the role associated with the user-profile defines one or more rights to access information from the mainframe application, and wherein the role is defined based on an identity of the user;

initiating, via the one or more hardware processors, corresponding to the request an access session with the mainframe server for accessing the mainframe application, wherein the role assigned to the user-profile is associated with the access session;

receiving, via the one or more hardware processors, a screen, corresponding to the access session, comprising a plurality of fields, wherein one or more field of the plurality of fields comprises sensitive data associated with the mainframe application;

identifying, via the one or more hardware processors, uniqueness in the screen corresponding to the access session from the mainframe application, wherein identifying the uniqueness comprises determining contextual information associated with the plurality of fields of the screen and identifying differentiation of similar fields from the plurality of fields, based on relationship among the plurality of fields, wherein the uniqueness in the screen is identified by,
  parsing data associated with the plurality of fields of the screen to form fragments of the data to identify relationship among the plurality of fields; and
  systematically storing the fragments of the data in a traversable structure, wherein systematically storing the fragments of the data in the traversable structure facilitates in determining the contextual information and differentiate similar fields of the plurality of fields in the screen;
fetching, via the one or more hardware processors and from a rules repository, at least one rule corresponding to the screen based on the role and the uniqueness of the screen, wherein the at least one rule is configured for defining masking logic and identifying the one or more fields of the screen to be masked; and
masking, via the one or more hardware processors, the one or more fields of the screen based on the at least one rule, the contextual information associated with the one or more fields, and the differentiation of the similar fields,
  wherein the masking comprises configuring an intermediate representation information comprising the contextual information associated with context of the plurality of fields of the screen, the context comprising position, and relationship between the plurality of fields.

2. The method of claim 1, further comprising:
connecting with an external server, the external server comprising pre-stored user data having authentication status of a plurality of user-profiles to determine the authentication status of the user profile; and
generating the access session corresponding to the request upon determining the authentication status of the user profile to be valid.

3. The method of claim 1, wherein the intermediate representation information further comprises actual values of the one or more fields of the screen, and wherein the actual values of the one or more fields are masked at a display component of the computing device.

4. The method of claim 3, further comprising:
receiving a subsequent request to access the one or more fields, the subsequent request being a write request;
replacing the masked value with the actual values, the actual values being retrieved from the intermediate representation information;
sending the actual values to the mainframe server; and
allowing, in response to the subsequent request, an access the actual values associated with the one or more sensitive fields.

5. The method of claim 4, wherein the actual values are stored in form of key-value pairs, a key of a key-value pair comprising one of:
an identifier of a field to be masked, and
a function F(x) adapted to generate a unique key for the field based on a relative position to generate the key, the function adapted to generate the key based on the intermediate representation information.

6. The method of claim 1, further comprising logging user activity associated with the request and the subsequent request to access the mainframe application when the mainframe application is shared by a group of users, and wherein the mainframe application is accessed by automatically sending username and password of the mainframe application to be mainframe server.

7. The method of claim 1, further comprising:
allocating a privacy budget to each user-profile of the plurality of user-profiles;
associating respective scores with the one or more fields of the mainframe application; and
deducting scores equal to the respective score from the privacy budget upon the access to the one or more fields.

8. The method of claim 1, wherein the traversable structure is in the form of at least one of a hash tree, a graph of the screen, and a logical tree-like structure.

9. A processor-implemented system executed by a computing device for dynamic masking of data associated with a mainframe application hosted on a mainframe server, the computing device comprising:
one or more memories; and
one or more hardware processors, the one or more memories coupled to the one or more hardware processors, wherein the one or more hardware processors are capable of executing programmed instructions stored in the one or more memories to,
  receive a request to access a mainframe application from a user through a user-profile associated with the user and comprising identity information of the user attempting to access the mainframe application, wherein an authentication status of the user profile is valid;
  retrieve, from a roles-repository, a role assigned to the user-profile, wherein the role associated with the user-profile defines one or more rights to access information from the mainframe application, and wherein the role is defined based on an identity of the user;
  initiate, corresponding to the request, an access session with the mainframe server for accessing the mainframe application, wherein the role assigned to the user-profile is associated with the access session;
  receive, a screen, corresponding to the access session comprising a plurality of fields, wherein one or more field of the plurality of fields comprises sensitive data associated with the mainframe application;
identify uniqueness in the screen corresponding to the access session from the mainframe application, wherein identifying the uniqueness comprises determining contextual information associated with the plurality of fields of the screen and identifying differentiation of similar fields from the plurality of fields, based on relationship among the plurality of fields, wherein the uniqueness in the screen is identified by,
  parsing data associated with the plurality of fields of the screen to form fragments of the data to identify relationship among the plurality of fields; and
  systematically storing the fragments of the data in a traversable structure, wherein systematically storing the fragments of the data in the traversable structure facilitates in determining the contextual information and differentiate similar fields of the plurality of fields in the screen;
fetch, from a rules repository stored in the one or more memories of the computing device, at least one rule corresponding to the screen based on the role and the uniqueness of the screen, wherein the at least one rule is configured for defining masking logic and identifying the one or more fields of the screen to be masked; and mask the one or more fields of the screen based on the at least one rule and the contextual information associated with the one or more fields, and the differentiation of the similar fields, wherein the masking comprises configuring an intermediate representation information comprising the contextual information associated with context of the plurality of fields of the screen, the context comprising position, and relationship between the plurality of fields.

10. The system of claim 9, said one or more hardware processors are further configured by the instructions to:

connect with an external server, the external server comprising pre-stored user data having authentication status of a plurality of user-profiles to determine the authentication status of the user profile; and generate the access session corresponding to the request upon determining the authentication status of the user profile to be valid.

11. The system of claim 9, wherein the intermediate representation information further comprises actual values of the one or more fields of the screen, and wherein the actual values of the one or more fields are masked at a display component of the computing device.

12. The system of claim 11, wherein said one or more hardware processors are further configured by the instructions to:

receive a subsequent request to access the one or more fields, the subsequent request being a write request;

replace the masked value with the actual values, the actual values being retrieved from the intermediate representation information;

send the actual values to the mainframe server; and allow, in response to the subsequent request, an access the actual values associated with the one or more sensitive fields.

13. The system of claim 12, wherein the actual values are stored in form of key-value pairs, a key of a key-value pair comprising one of:

an identifier of a field to be masked, and a function F(x) adapted to generate a unique key for the field based on a relative position to generate the key, the function adapted to generated the key based on the intermediate representation information.

14. The system of claim 9, wherein said one or more hardware processors are further configured by the instructions to:

log user activity associated with the request and the subsequent request to access the mainframe application; and mask the one or more fields of the screen by fetching the at least one rule based on one or more attributes selected from time, a day, a geographical location and an IP address.

15. The system of claim 9, wherein said one or more hardware processors are further configured by the instructions to:

allocate a privacy budget to each user-profile of the plurality of user-profiles; associate respective scores with the one or more fields of the mainframe application; and deduct scores equal to the respective score from the privacy budget upon the access to the one or more fields.

16. The system of claim 9, wherein to identify the uniqueness in the screen, said one or more hardware processors are further configured by the instructions to:

parse data associated with the plurality of fields of the screen to form fragments of data to identify relationship between the plurality of fields; and systematically store the fragments of the data in a traversable structure, wherein systematically storing the fragments of the data facilitates in determining the contextual information and differentiate similar fields of the plurality of fields in the screen.

17. A non-transitory computer-readable medium having embodied thereon a computer program for executing a method for dynamic masking data associated with a mainframe application hosted on a mainframe server, the method comprising:

receiving a request to access a mainframe application from a user through a user-profile associated with the user and comprising identity information of the user attempting to access the mainframe application, wherein an authentication status of the user profile is valid;

retrieving, via the one or more hardware processors, a role assigned to the user-profile from a roles repository, wherein the role associated with the user-profile defines one or more rights to access information from the mainframe application, and wherein the role is defined based on an identity of the user;

initiating, via the one or more hardware processors and corresponding to the request, an access session with the mainframe server for accessing the mainframe application, wherein the role assigned to the user-profile is associated with the access session;

receiving, via the one or more hardware processors, a screen, corresponding to the access session, comprising a plurality of fields, wherein one or more field of the plurality of fields comprises sensitive data associated with the mainframe application;

identifying, via the one or more hardware processors, uniqueness in the screen corresponding to the access session from the mainframe application, wherein identifying the uniqueness comprises determining contextual information associated with the plurality of fields of the screen and identifying differentiation of similar fields from the plurality of fields, based on relationship among the plurality of fields, wherein the uniqueness in the screen is identified by, parsing data associated with the plurality of fields of the screen to form fragments of the data to identify relationship among the plurality of fields; and systematically storing the fragments of the data in a traversable structure, wherein systematically storing the fragments of the data in the traversable structure facilitates in determining the contextual information and differentiate similar fields of the plurality of fields in the screen;

fetching, via the one or more hardware processors and from a rules repository, at least one rule corresponding to the screen based on the role and the uniqueness of the screen, wherein the at least one rule is configured for defining masking logic and identifying the one or more fields of the screen to be masked; and masking, via the one or more hardware processors, the one or more fields of the screen based on the at least one rule, the contextual information associated with the one or more fields, and the differentiation of the similar fields, wherein the masking comprises configuring an intermediate representation information comprising the contextual information associated with context of the plurality of fields of the screen, the context comprising position, and relationship between the plurality of fields.

\* \* \* \* \*